US010435036B2

(12) United States Patent
Prakah-Asante et al.

(10) Patent No.: US 10,435,036 B2
(45) Date of Patent: Oct. 8, 2019

(54) ENHANCED CURVE NEGOTIATION

(71) Applicant: Ford Global Technologies, LLC, Dearborn, MI (US)

(72) Inventors: Kwaku O. Prakah-Asante, Commerce Township, MI (US); Padma Aiswarya Kolisetty, Chennai (IN); Yifan Chen, Ann Arbor, MI (US); Basavaraj Tonshal, Northville, MI (US); Hsin-hsiang Yang, Ann Arbor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/749,286

(22) PCT Filed: Sep. 28, 2015

(86) PCT No.: PCT/US2015/052553
§ 371 (c)(1),
(2) Date: Jan. 31, 2018

(87) PCT Pub. No.: WO2017/058134
PCT Pub. Date: Apr. 6, 2017

(65) Prior Publication Data
US 2018/0222494 A1  Aug. 9, 2018

(51) Int. Cl.
*B60W 50/16* (2012.01)
*G06F 1/16* (2006.01)
(52) U.S. Cl.
CPC ............. *B60W 50/16* (2013.01); *G06F 1/163* (2013.01); *B60W 2520/125* (2013.01); *B60W 2550/12* (2013.01); *B60W 2550/146* (2013.01)

(58) Field of Classification Search
CPC ...... G01C 21/26; G01C 21/28; G01C 21/3697
See application file for complete search history.

(56) References Cited

U.S. PATENT DOCUMENTS

| 5,315,295 | A  | 5/1994  | Fujii |
| 7,266,438 | B2 | 9/2007  | Kellum et al. |
| 7,692,552 | B2 | 4/2010  | Harrington et al. |
| 7,908,060 | B2 | 3/2011  | Basson et al. |
| 8,296,033 | B2 | 10/2012 | Lu et al. |

(Continued)

FOREIGN PATENT DOCUMENTS

GB   2442492 A   4/2008

OTHER PUBLICATIONS

International Search Report and Written Opinion dated Dec. 18, 2015 re PCT/US2015/0525534.

*Primary Examiner* — Hongmin Fan
(74) *Attorney, Agent, or Firm* — Brandon Hicks; Bejin Bieneman PLC

(57) ABSTRACT

Data on an impending curve, speed, and acceleration of a vehicle are collected. A curve attention output that is a measure of the vehicle speed, the vehicle acceleration, and the curvature of the impending curve is determined based at least in part on the data. An output mechanism in a wearable device is activated at a first intensity when the curve attention output exceeds or is equal to a first threshold and below a second threshold. The output mechanism is activated at a second intensity when the curve attention output exceeds or is equal to the second threshold and below a third threshold.

20 Claims, 2 Drawing Sheets

(56) References Cited

U.S. PATENT DOCUMENTS

| | | |
|---|---|---|
| 9,539,901 B1* | 1/2017 | Clauss .................. B60K 31/18 |
| 2004/0252027 A1 | 12/2004 | Torkkola et al. |
| 2007/0050127 A1* | 3/2007 | Kellum .................. G01C 21/26 |
| | | 701/439 |
| 2007/0069874 A1 | 3/2007 | Huang et al. |
| 2008/0174451 A1 | 7/2008 | Harrington et al. |
| 2009/0037104 A1 | 2/2009 | Basson et al. |
| 2010/0250045 A1 | 9/2010 | Miura et al. |
| 2012/0139816 A1 | 6/2012 | King et al. |
| 2014/0266655 A1 | 9/2014 | Palan |
| 2016/0207454 A1* | 7/2016 | Cuddihy .................. B60Q 9/00 |

* cited by examiner

ENHANCED CURVE NEGOTIATION

CROSS-REFERENCE TO RELATED APPLICATIONS

This application is a national stage of, and claims priority to, Patent Cooperation Treaty Application No. PCT/US2015/052553, filed on 28 Sep. 2015, which application is hereby incorporated herein by reference in its entirety.

BACKGROUND

Curve over-speed systems provide a way for vehicle drivers to adjust driving behavior if speed approaching a curve is too high. An important feature of such systems may be providing output indicating curve over-speed so that the driver can take corrective action. However, current mechanisms to provide output concerning an over-speed situation do not provide output targeted, tailored, or calibrated to a driver.

DETAILED DESCRIPTION

Figure 1:
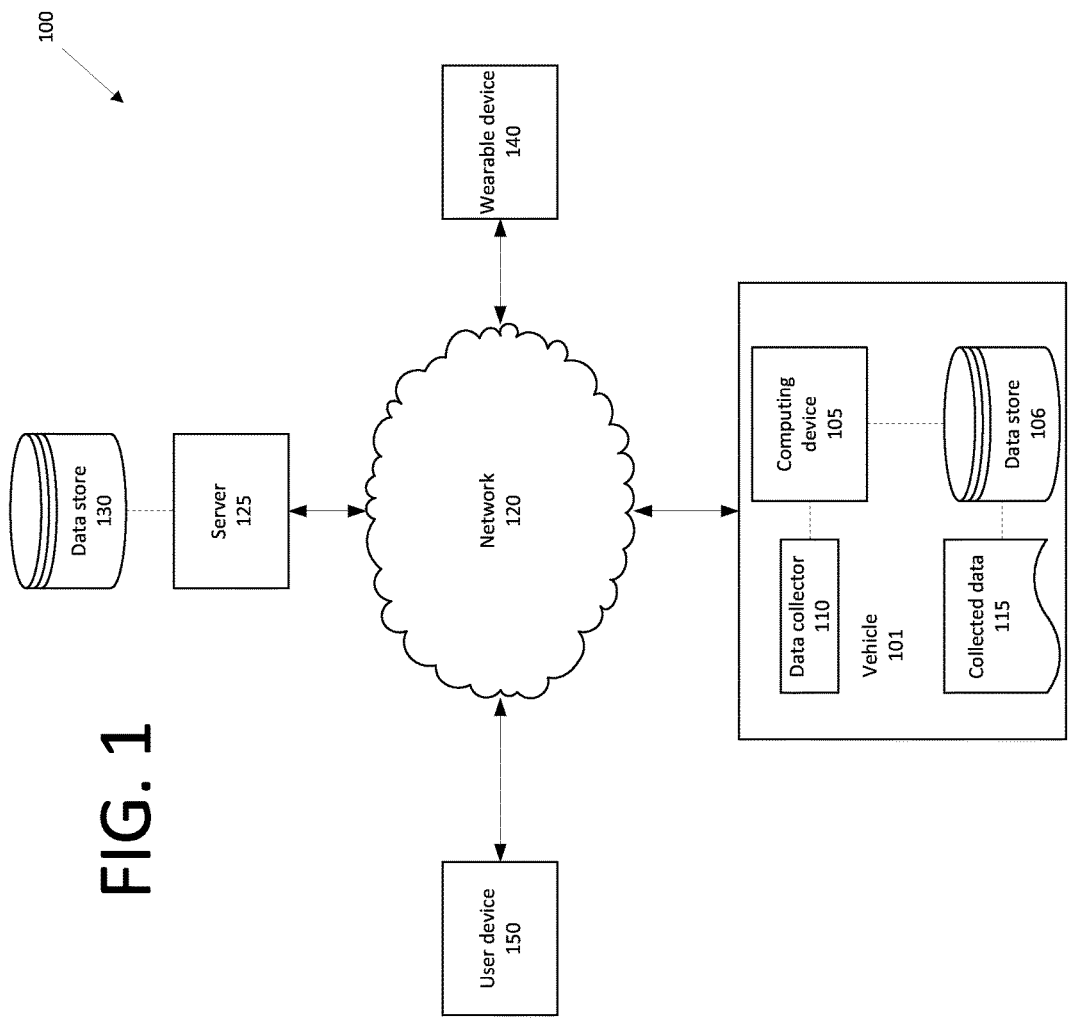
FIG. 1 is a block diagram of an example system including a wearable device providing output indicating attention to an impending curve.

FIG. 1 illustrates a system 100 including a wearable device 140 communicatively coupled to a vehicle 101 computing device 105. The computing device 105 is programmed to receive collected data 115, from one or more data collectors 110, e.g., vehicle 101 sensors, concerning various metrics related to the vehicle 101. For example, the metrics may include a velocity of the vehicle 101, vehicle 101 acceleration and/or deceleration, data related to vehicle 101 path or steering including lateral acceleration, curvature of the road, biometric data related to a vehicle 101 operator, e.g., heart rate, respiration, pupil dilation, body temperature, state of consciousness, etc. Further examples of such metrics may include measurements of vehicle systems and components (e.g. a steering system, a powertrain system, a brake system, internal sensing, external sensing, etc.). The computing device 105 may be programmed to collect data 115 from the vehicle 101 in which it is installed, sometimes referred to as a host vehicle 101, and/or may be programmed to collect data 115 about a second vehicle 101, e.g., a target vehicle.

The computing device 105 is generally programmed for communications on a controller area network (CAN) bus or the like. The computing device 105 may also have a connection to an onboard diagnostics connector (OBD-II). Via the CAN bus, OBD-II, and/or other wired or wireless mechanisms, the computing device 105 may transmit messages to various devices in a vehicle and/or receive messages from the various devices, e.g., controllers, actuators, sensors, etc., including data collectors 110. Alternatively or additionally, in cases where the computing device 105 actually comprises multiple devices, the CAN bus or the like may be used for communications between devices represented as the computing device 105 in this disclosure. In addition, the computing device 105 may be programmed for communicating with the network 120, which, as described below, may include various wired and/or wireless networking technologies, e.g., cellular, Bluetooth, wired and/or wireless packet networks, etc.

The computing device 105 may be programmed to provide a warning during a curve over-speed, as is known, the processor storing instructions to determine whether the vehicle 101 is about to leave a current lane and, upon such determination, to actuate one or more vehicle mechanisms without driver intervention, e.g., braking, steering, throttle, etc. Further, the computing device 105 may include or be connected to an output mechanism to indicate a speed greater than recommended for an impending curve, e.g., sounds and/or visual indicators provided via the vehicle 101 HMI.

The data store 106 may be of any known type, e.g., hard disk drives, solid-state drives, servers, or any volatile or non-volatile media. The data store 106 may store the collected data 115 sent from the data collectors 110.

Data collectors 110 may include a variety of devices. For example, various controllers in a vehicle may operate as data collectors 110 to provide data 115 via the CAN bus, e.g., data 115 relating to vehicle speed, acceleration, system and/or component functionality, etc., of any number of vehicles 101, including the host vehicle and/or the target vehicle. Further, sensors or the like, global positioning system (GPS) equipment, etc., could be included in a vehicle and configured as data collectors 110 to provide data directly to the computer 105, e.g., via a wired or wireless connection. Sensor data collectors 110 could include mechanisms such as RADAR, LIDAR, sonar, etc. sensors that could be deployed to measure a distance between the vehicle 101 and other vehicles or objects. Yet other data collectors 110 could include cameras, breathalyzers, motion detectors, etc., i.e., data collectors 110 to provide data 115 for evaluating a condition or state of a vehicle 101 operator.

Collected data 115 may include a variety of data collected in a vehicle 101. Examples of collected data 115 are provided above, and moreover, data 115 is generally collected using one or more data collectors 110, and may additionally include data calculated therefrom in the computer 105, and/or at the server 125. In general, collected data 115 may include any data that may be gathered by the data collectors 110 and/or computed from such data. The computing device 105 may use the collected data 115 to develop a curve attention profile for the occupant. The curve attention profile may incorporate the occupant's driving habits and characteristics, e.g., age, experience driving, etc., as well as the collected data 115, e.g. road condition, lateral acceleration, curvature of an impending curve, movement of the vehicle 101, etc. The curve attention profile may be used by the computing device 105 to detect a curve requiring occupant attention. The curve attention profile includes the predetermined thresholds, maximum parameter values, and the adaptive constants described below. The computing device 105 may create several curve attention profiles for different occupants and store them in the data store 106.

The system 100 may further include a network 120 connected to a server 125 and a data store 130. The computer 105 may further be programmed to communicate with one or more remote sites such as the server 125, via a network 120, such remote site possibly including a data store 130. The network 120 represents one or more mechanisms by which a vehicle computer 105 may communicate with a remote server 125. Accordingly, the network 120 may be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth, IEEE 802.11 , etc.), local area networks (LAN) and/or wide area networks (WAN), including the Internet, providing data communication services.

The server 125 may be programmed to determine an appropriate action for one or more vehicles 101, and to provide direction to the computer 105 to proceed accordingly. The server 125 may be one or more computer servers, each generally including at least one processor and at least one memory, the memory storing instructions executable by the processor, including instructions for carrying out various steps and processes described herein. The server 125 may include or be communicatively coupled to a data store 130 for storing collected data 115, records relating to potential incidents generated as described herein, lane departure profiles, etc. Further, the server 125 may store information related to particular vehicle 101 and additionally one or more other vehicles 101 operating in a geographic area, traffic conditions, weather conditions, etc., within a geographic area, with respect to a particular road, city, etc. The server 125 could be programmed to provide alerts to a particular vehicle 101 and/or other vehicles 101.

A wearable device 140 may be any one of a variety of computing devices including a processor and a memory, as well as communication capabilities that is programmed to be worn on a driver's body. For example, the wearable device 140 may be a watch, a smart watch, a vibrating apparatus, etc. that includes capabilities for wireless communications using IEEE 802.11 , Bluetooth, and/or cellular communications protocols. Further, the wearable device 140 may use such communications capabilities to communicate via the network 120 and also directly with a vehicle computer 105, e.g., using Bluetooth.

The system 100 may include a user device 150. The user device 150 may be any one of a variety of computing devices including a processor and a memory, e.g., a smartphone, a tablet, a personal digital assistant, etc. the user device 150 may use the network 120 to communicate with the vehicle computer 105 and the wearable device 140.

Figure 2:
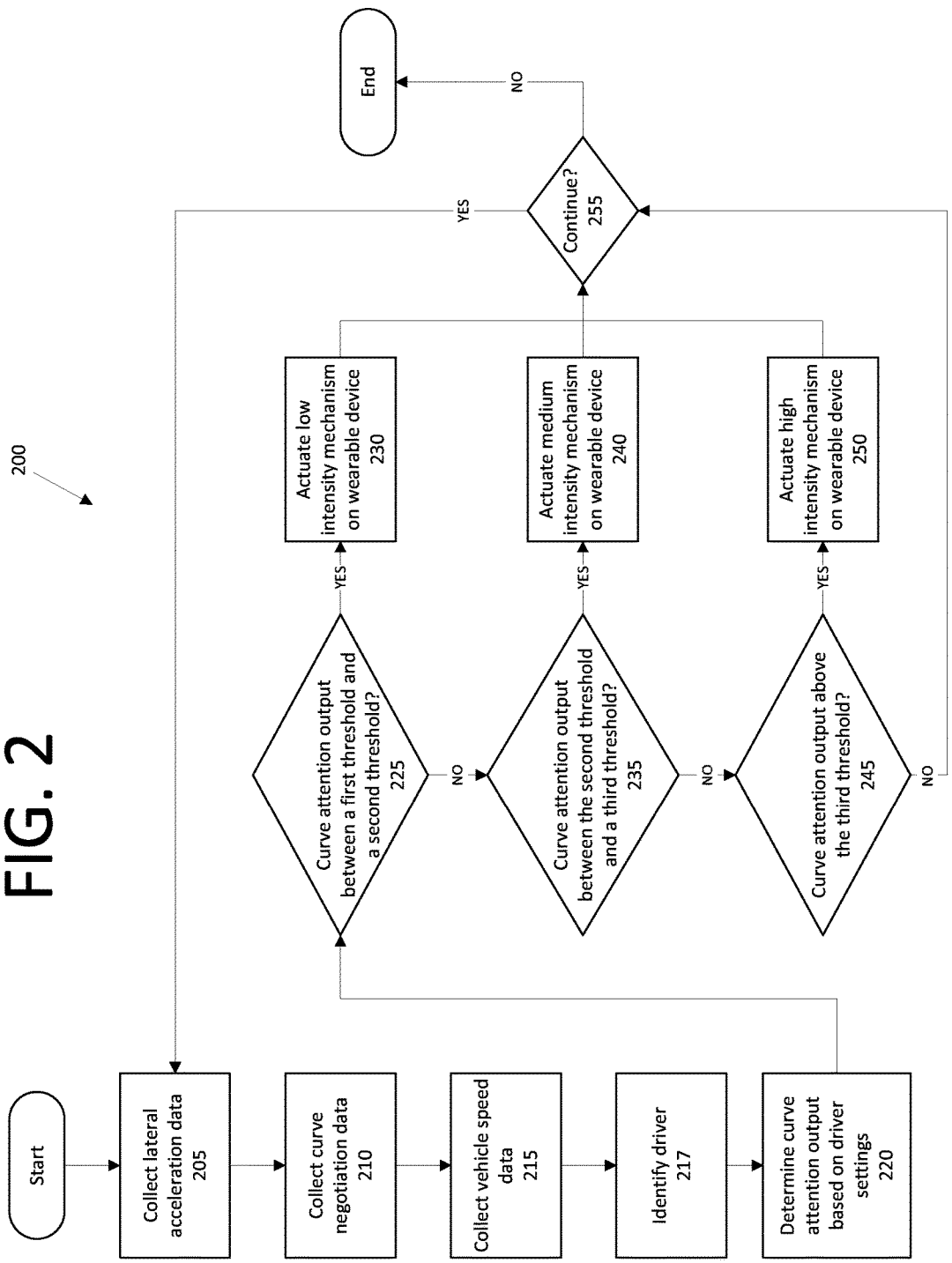
FIG. 2 is a block diagram of an example process for providing an indication of curve negotiation from a wearable device.

FIG. 2 illustrates an example process 200 for employing the wearable device 140 in conjunction with programming in the computer 105 to determine curve over-speed as discussed above during a drive cycle. The process 200 begins in a block 205, in which the computing device 105 collects data 115 on a lateral acceleration of a vehicle 101, being acceleration perpendicular to the forward movement of the vehicle 101.

Next, in a block 210, the computing device 105 collects data 115 on curve negotiation of the vehicle 101, i.e., the movement of the vehicle 101 around a curve based on the curvature of the curve. The curve negotiation data may include a curvature datum, being based on curvature data received from the server 125 from, e.g., a global position system and/or a snap server, or a vision system obtained via the vehicle 101 CAN bus. The curvature datum is the inverse of a radius of curvature of the curve. The radius of curvature is a measure of the radius of the circular arc defined by the curve.

Next, in a block 215, the computing device 105 collects data 115 on vehicle speed from the data collectors 110.

Next, in a block 217, the computing device 105 identifies a vehicle driver. The computing device 105 may identify the driver in one or more manners, e.g., receiving data from one or more of the wearable device 140, the user device 150, and/or the data collectors 110. For example, as is known, the occupant could be identified using image recognition techniques in the computer 105 using data 115 from a camera data collector 110, a user identity could be input via a device 140 of a vehicle 101 HMI, or the device 140 could identify the user, i.e., vehicle 101 occupant, via collected biometric data, e.g., a fingerprint, etc. Upon identifying the occupant, the computing device 105 may retrieve from its data store 106 information about the occupant, including age, size, driving skill level, preferred mechanisms for receiving information (e.g., haptic, audio, etc.), lane departure profile, etc.

Next, in a block 220, the computing device 105 determines a curve attention output. For example, the curve attention output can be determined by the following equation:

$$CA_{out} = \alpha \frac{\text{abs}(Lat)}{\text{Max}(Lat)} + \beta \frac{Curv}{\text{Max}(Curv)} + \gamma \frac{(\text{Speed} - \text{Max}(\text{Speed}))}{\text{Max}(\Delta \text{Speed})}$$

where $CA_{out}$ is the curve attention output, abs is the absolute value function, Lat is the lateral acceleration of the vehicle 101, Curv is the curvature datum, Speed is the vehicle 101 speed for vehicle speeds greater than the Max(Speed), Max( ) refers to the recommended maximum of the parameter in the parentheses. For example, Max (Speed) is a maximum recommended speed for the impending curve and/or a speed limit for the road; Max(Lat) is a maximum recommended lateral acceleration for the impending curve, and Max(Curv) is the maximum recommended curvature for the impending curve. The recommendations may be collected from, e.g., the server 125, the data store 106, and/or the curve attention profile. ΔSpeed is the speed deviation from a speed target, and Max (Δ Speed) is the maximum speed deviation from a maximum speed target. The $CA_{out}$ is computed and normalized to a value between 0 and 1 . Values closer to 1 , for example $CA_{out} \geq 0.75$ , require higher curve attention than, e.g., $(0.5 \leq CA_{out} < 0.75)$, and for, e.g., $(0.3 \leq CA_{out} < 0.50)$. In addition, if the vehicle speed in approaching a curve obtained from GPS/maps is greater than a recommended vehicle speed, then $CA_{out}$ is set to 1.

Determination of the maximum values for computation of $CA_{out}$ may he based on vehicle handling performance, roadway geometry and posted speed limits. For example, the maximum lateral acceleration based Max(Lat) on vehicle handling performance may be chosen as 4.5 m/s². The Max(ΔSpeed) may be chosen as 4.4 m/s. The maximum curvature Max (Curv) is determined as a factor of the radius of curvature as provided from roadway construction. For example, the curvature radius may be chosen as 498 m to compute the curvature.

The constants α, β, γ are adaptive constants that weight each of the lateral acceleration, curvature datum, and the speed. The adaptive constants α, β, γ may be predetermined for the driver and listed in the driver's curve attention profile. The adaptive constants may be tunable based on, e.g., weather conditions. For example α, β, γ may be chosen as (075, 0.05, 0.20) respectively, to increase the contribution of the lateral acceleration in poor weather conditions. In addition, the constants may be chosen so that the maximum contribution of each of the measures are almost equally weighted for computation of the $CA_{out}$ value (e.g., 0.34, 0.33, and 0.33). Furthermore, if certain data are not available, e.g. if the posted speed limit or curvature information is not available, the $CA_{out}$ value would depend solely on the lateral acceleration.

Next, in a block 225, the computing device 105 determines whether the curve attention output is between a first threshold and a second threshold, i.e., exceeds or is equal to the first threshold and below the second threshold. An exemplary set of first and second thresholds may be $0.3 \leq CA_{out} < 0.5$. The first and second thresholds may be predetermined and stored in the driver's curve attention profile, and may be determined based on, e.g., the driver's age, experience, driving history, etc. For example, a novice driver may have a lower first threshold to account for increased reaction time, a skilled driver may have a higher first threshold, etc. If the curve attention output is between the first threshold and the second threshold, the process continues in the block 230. Otherwise, the process continues in a block 235.

In the block 230, the computing device 105 provides an instruction to the wearable device 140 to actuate one or more output mechanisms at a first intensity. The output mechanisms may include haptic output, e.g. a vibration, audio output, and/or visual output, e.g. flashing lights, flashing colors, etc. Based on the information from the block 205, the one or more output mechanism may be selected according to the occupant. For example, an occupant who is hard of hearing may have a stronger vibration output, while another occupant may prefer a visual output. Advantageously, the computing device 105 may be programmed, e.g., including setting the threshold of the block 225, to cause actuation of the wearable device output prior to an alert, warning, or evasive action implemented by a conventional curve overspeed warning system, e.g., a system that provides an indication of, or reacts to, curve over-speed by actuating vehicle lights, sounds, brakes, etc. before the curve is traveled. Thus, the driver of the vehicle 101 in the context of the present system 100 may take corrective and/or avoidance action earlier, and in a safer manner, than in presently existing systems. The process 200 then continues in a block 255.

In the block 235, the computing device 105 determines whether the curve attention output is between the second threshold and a third threshold, i.e., exceeds or is equal to the second threshold and below the third threshold. An exemplary set of second and third thresholds may be $0.5 \leq CA_{out} < 0.75$. The third threshold may be predetermined and stored in the curve attention profile, or may be collected from the server 125 from, e.g., global position data, or may be determined by the curve over-speed system. If the curve attention output is between the second threshold and the third threshold, the process 200 continues in a block 240. Otherwise, the process 200 continues in a block 245.

In the block 240, the computing device 105 provides an instruction to the wearable device 140 to actuate the output mechanism at a second intensity. The second intensity may be stronger than the first intensity, e.g., louder, stronger vibration, brighter lights, etc., to indicate to the user the increased severity of risk of the impending curve to the vehicle 101. The process 200 then continues in the block 255.

In the block 245, the computing device 105 determines whether the curve attention output exceeds or is equal to the third threshold. If the curve attention output exceeds or is equal to the third threshold, the process 200 continues in a block 250. Otherwise, the process 200 continues in the block 255.

In the block 250, the computing device 105 provides an instruction to the wearable device 140 to actuate the output mechanism at a third intensity. The third intensity may be stronger than the first and second intensities, indicating the highest severity of the impending curve to the driver. The process 200 then continues in the block 255.

In the block 255, the computing device 105 determines whether to continue monitoring impending curves to actuate the output mechanisms. If the computing device 105 determines to continue, the process 200 returns to the block 205 to collect more data. Otherwise, the process 200 ends.

The ranges for actuating the output mechanisms at the first, second, and third intensities in the blocks 225, 235, and 245 are inclusive with respect to their lower bounds and exclusive with respect to their upper bounds. That is, when the curve attention output equals the first threshold, the computing device 105 actuates the output mechanisms in the wearable device 140 at the first intensity. For all values of the curve attention output up to, but not including, the second threshold, the output mechanisms are actuated at the first intensity. If the curve attention output equals the second threshold, the computing device 105 actuates the output mechanisms in the wearable device 140 at the second intensity, and not the first intensity. Similarly, if the curve attention output equals the third threshold, the computing device 105 actuates the output mechanisms in the wearable device 140 at the third intensity, and not the second intensity. This is to avoid ambiguity in programming of the computing device 105; if the range for the first intensity in the block 225 were inclusive with respect to the second threshold, then the computing device 105 might actuate the output mechanisms at both the first and second intensities when the curve attention output equals the second threshold. To avoid a situation where the computing device 105 is instructed to actuate the output mechanisms at two different intensities, the ranges are exclusive with respect to their upper bounds so that when the curve attention output equals one of the first, second, or third thresholds, the computing device 105 can only actuate the output mechanisms at one respective intensity.

To further illustrate this point, the ranges in the blocks 225, 235, and 245 may be chosen as follows:
  first threshold $\leq CA_{out} <$ second threshold → first intensity
  second threshold $\leq CA_{out} <$ third threshold → second intensity
  third threshold $\leq CA_{out}$ → third intensity The use of the "less than or equal to" signs on the lower bounds and the "less than (but not equal to)" signs on the upper bounds indicates that when the curve attention output equals one of the thresholds, only one intensity can be used.

As used herein, the adverb "substantially" modifying an adjective means that a shape, structure, measurement, value, calculation, etc. may deviate from an exact described geometry, distance, measurement, value, calculation, etc., because of imperfections in materials, machining, manufacturing, sensor measurements, computations, processing time, communications time, etc.

Computing devices 105 generally each include instructions executable by one or more computing devices such as those identified above, and for carrying out blocks or steps of processes described above. Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in the computing device 105 is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of systems and/or processes herein are provided for the purpose of illustrating certain embodiments, and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

The invention claimed is:

1. A system, comprising a computer including a processor and a memory, the memory storing instructions executable by the computer to:
    collect data on an impending curve, speed, and acceleration of a vehicle;
    determine a curve attention output that is a measure of the vehicle speed, the vehicle acceleration, and the curvature of the impending curve based at least in part on the data;
    provide an output in a wearable device at a first intensity when the curve attention output is equal to or exceeds a first threshold and is below a second threshold; and
    provide the output at a second intensity when the curve attention output is equal to or exceeds the second threshold and is below a third threshold;
    wherein the curve attention output is based at least in part on a normalized vehicle speed that is a difference between a maximum recommended vehicle speed and the current vehicle speed divided by a maximum change in vehicle speed.

2. The system of claim 1, wherein the instructions include instructions to provide the output at a third intensity when the curve attention output is equal to or exceeds the third threshold.

3. The system of claim 1, wherein the output is a haptic output.

4. The system of claim 1, wherein the curve attention output is based at least in part on a lateral acceleration of the vehicle, a curvature datum based on a curvature of the impending curve, and the vehicle speed.

5. The system of claim 4, wherein the curve attention output is determined by a sum of:
    a normalized lateral acceleration that is the current lateral acceleration divided by a maximum lateral acceleration and multiplied by a first adaptive constant;
    a normalized curvature datum that is the current curvature datum divided by a maximum curvature datum and multiplied by a second adaptive constant; and
    the normalized vehicle speed multiplied by a third adaptive constant.

6. The system of claim 5, wherein the first, second, and third adaptive constants and the maximum lateral acceleration, curvature datum, and change in vehicle speed are adjustable based on identifying a vehicle occupant.

7. The system of claim 5, wherein the maximum recommended vehicle speed is a recommended vehicle speed collected from at least one of a global position system, a map server, and a curve over speed warning system.

8. The system of claim 1, wherein the data include weather information.

9. The system of claim 1, wherein the instructions include instructions to adjust the first threshold and the second threshold based on identifying the vehicle occupant.

10. The system of claim 9, wherein the instructions include instructions to provide the output at a third intensity when the curve attention output is equal to or exceeds a third threshold, the third threshold based on identifying the vehicle occupant.

11. A method, comprising:
    collecting data on an impending curve, speed and acceleration of a vehicle;
    determining a curve attention output that is a measure of the vehicle speed, the vehicle acceleration, and the curvature of impending curve based at least in part on the data;
    providing an output in a wearable device at a first intensity when the curve attention output is equal to or exceeds a first threshold and is below a second threshold; and
    providing the output at a second intensity when the curve attention output is equal to or exceeds the second threshold and is below a third threshold;
    wherein the curve attention output is based at least in part on a normalized vehicle speed that is a difference between a maximum recommended vehicle speed and the current vehicle speed divided by a maximum change in vehicle speed.

12. The method of claim 11, further comprising providing the output at a third intensity when the curve attention output is equal to or exceeds the third threshold.

13. The method of claim 11, wherein the curve attention output is based at least in part on a lateral acceleration of the vehicle, a curvature datum based on a curvature of the impending curve, and the vehicle speed.

14. The method of claim 13, wherein the curve attention output is determined by a sum of:
   a normalized lateral acceleration that is the current lateral acceleration divided by a maximum lateral acceleration and multiplied by a first adaptive constant;
   a normalized curvature datum that is the current curvature datum divided by a maximum curvature datum and multiplied by a second adaptive constant; and
   the normalized vehicle speed multiplied by a third adaptive constant.

15. The method of claim 14, wherein the first, second, and third adaptive constants and the maximum lateral acceleration, curvature datum, and change in vehicle speed are adjustable based on identifying a vehicle occupant.

16. A system, comprising:
   a wearable device;
   means for collecting data on an impending curve, speed, and acceleration of a vehicle;
   means for determining a curve attention output that is a measure of the vehicle speed, the vehicle acceleration, and the curvature of the impending curve based at least in part on the data;
   means for providing an output in a wearable device at a first intensity when the curve attention output is equal to or exceeds a first threshold and is below a second threshold; and
   means for providing the output at a second intensity when the curve attention output is equal to or exceeds the second threshold and is below a third threshold;
   wherein the curve attention output is based at least in part on a normalized vehicle speed that is a difference between a maximum recommended vehicle speed and the current vehicle speed divided by a maximum change in vehicle speed.

17. The system of claim 16, wherein the wearable device includes a haptic device.

18. The system of claim 16, further comprising a computer programmed to provide the output in the wearable device.

19. The system of claim 16, further comprising means for providing the output at a third intensity when the curve attention output is equal to or exceeds the third threshold.

20. The system of claim 16, wherein the curve attention output is based at least in part on a lateral acceleration of the vehicle, a curvature datum based on a curvature of the impending curve, and the vehicle speed.

* * * * *